May 26, 1970 H. W. HAGADORN ET AL 3,514,768

MULTITRANSDUCER PACKAGE

Filed Oct. 23, 1965 4 Sheets-Sheet 1

INVENTORS
HUBERT W. HAGADORN
RICHARD I. MIZRAHI
DONALD T. STAFFIERE
BY
John J. McCormack
ATTORNEY

INVENTORS
HUBERT W. HAGADORN
RICHARD I. MIZRAHI
DONALD T. STAFFIERE

BY John J. McCormack
ATTORNEY

MULTITRANSDUCER PACKAGE

Filed Oct. 23, 1965 4 Sheets-Sheet 3

INVENTORS
HUBERT W. HAGADORN
RICHARD I. MIZRAHI
DONALD T. STAFFIERE
BY
John J. McCormack
ATTORNEY May 26, 1970 H. W. HAGADORN ET AL 3,514,768

MULTITRANSDUCER PACKAGE

Filed Oct. 23, 1965 4 Sheets-Sheet 4

INVENTORS
HUBERT W. HAGADORN
RICHARD I. MIZRAHI
DONALD T. STAFFIERE

BY John J. McCormack

ATTORNEY

United States Patent Office 3,514,768
Patented May 26, 1970

3,514,768

MULTITRANSDUCER PACKAGE

Hubert W. Hagadorn, Brighton, Donald T. Staffiere, Wilmington, and Richard I. Mizrahi, Ashland, Mass., assignors to Honeywell Inc., Minneapolis, Minn., a corporation of Delaware Filed Oct. 23, 1965, Ser. No. 503,890
Int. Cl. G11b *5/10, 5/42*
U.S. Cl. 340—174.1 6 Claims

ABSTRACT OF THE DISCLOSURE

An improved magnetic head assembly of simplified and rugged construction. The head assembly includes an integral casing member having a recording face portion and sidewalls which define an internal cavity. A plurality of parallel channels are formed in the recording face portion corresponding, respectively, to recording tracks; each said channel being formed to communicate with the internal cavity and adapted to confine a transducer core member. The plurality of transducer core members are confined in an aligned array in the channels by spacers bonded in the outer ends of the channels and by a filler material inserted within the internal cavity.

The present invention relates to new and improved magnetic head assemblies and more particularly to means for improving such assemblies so as to simplify the structure and fabrication, both of the head casing and of the individual transducers, while at the same time rendering the head more rugged mechanically as well as for more accurately locating transducers.

Transducer assemblies for magnetic recording are becoming more complex, especially in response to performance requirements imposed by data processing applications. For one thing, such applications stress higher and higher bit-packing densities and recording-track densities, along with increased read/write speeds. Such applications consequently require a mechanically rugged head assembly, the transducers of which are nonetheless precisely positioned and aligned. Such assemblies are used, for instance, to transcribe information to and from multi-track magnetic media for computers, this media being interchangeable and comprising magnetic tape, drums, discs, unit records, and the like.

For most applications a ruggedized recording head is a virtual necessity, both for proper performance and for long life. For instance, the commonly used "flying" disc heads are exposed to severe acceleration and shock forces as they are thrust back and forth over the face of a magnetic disc, flying past at over 100 miles per hour. Ruggedness is also necessary during fabrication processes, since magnetic heads must customarily have their record-confronting surfaces conformed (e.g. ground away) and polished to a precise degree, for instance to impart aerodynamic characteristics thereto, as in the case of "flying" disc heads. Under the stresses imposed by these fabricating and operating forces, prior art magnetic heads have been subject to deformation, chipping and even cracking. For instance, this has been true of prior art non-magnetic ferrite casings, especially when they include fillings of flexible material such as resinous adhesives. At times the pressures imposed by handling and operating such heads may deform them somewhat, changing their characteristics; e.g. upsetting head-flatness. This has been especially true for prior art heads employing a multi-piece, non-integral casing construction since they are not integral and rigid and are thus fussy to grind to a hard, smooth finish. More especially, pre-slotted alumina-encased heads according to the invention can take a finish whose durability and abrasion resistance surpasses that of metallic heads, while also being sufficiently strong and lightweight to be thrust under high acceleration for high-speed positioning and alignment over record media. The present invention provides a solution to the above problems by prescribing a magnetic head having an integral one-piece, casing of rigid material, such as alumina, which will resist the stresses of handling and take a fine smooth finish.

Unfortunately, prior art transducer casings are commonly complex in structure and thus inapt for fabrication by techniques which are both simple and accurate. For instance, they have not lent themselves to simple, rectilinear machining steps, the accuracy of which may be most carefully controlled. On the contrary, prior casings commonly require expensive, relatively inaccurate aperturing operations, such as deep cutting, molding or the like, for forming "transducer-receiving" pockets therein. The present invention avoids the above disadvantages and accommodates simple rectilinear machining operations by prescribing a novel integral internally cavitated casing structure which is slotted with orthogonal channels for locating transducers. As a result, it has been surprisingly found that casing structures according to the invention may be so accurately formed that as to, themselves, define transducer-locating slots, using a shallow slot as a transducer-positioning guide, together with carefully machined ceramic spacer means for defining transducer position within a slot with high precision, yet with convenience. The shallow slots thus provided are not only easier to form, but much more accurate since the cutting member may be more accurately guided and the slot therefrom less subject to wander, taper or the like. Such an arrangement avoids the use of intermediate positioning means, such as shims, jigging arrangements and the like, heretofore inserted between transducers and casing-pockets therefor. Since such positioning intermediaries can contribute to cumulative positioning errors and, even worse, are at times deformable (even thermoplastic), such as the commonly used epoxy or similar resin material, they are best avoided.

Multitransducer head assemblies often characteristically suffer from inaccuracies in transducer location. For instance, when such heads are used for multi-track transcription of computer records, it is characteristically impossible to increase track density, that is, to locate transducer cores closer together without sacrificing precise control over their location, width and alignment. This is especially true for heads which must transcribe from different media interchangeably—a common requirement. However, the "slotted" casing arrangement of the invention, besides simplifying and ruggedizing a head structure, has also contributed towards resolving problems associated with track (core) location, since the casing slots may be very accurately controlled in location, size, and alignment. A feature of the invention is that the slotting depth prescribed can be unrelated to core size, being only just enough to establish core location during fabrication. This arrangement has provided an increased accuracy in "slot-centerline" location and also a reduction in "slot taper," both of which must be controlled by reduce core-centerline misalignment once the cores are secured in their respective slots. Tighter control on centerline error will, in turn, enable one to increase track densities and thus pack more information on the record media. Such an arrangement will be especially apt for head assemblies having more than one transducer per track, such as read/write heads, wherein plurality of cores may be located in one slot and thus be easily aligned, yet with precision.

The present invention finds especial utility for the fabrication of magnetic head assemblies having annular ferrite transducer cores. An annular core will be understood as one comprising one or more magnetizable circuit pieces, or legs, adapted, when assembled, to surround a central coil-receiving annulus. A ferrite core will be understood as comprising sintered ferromagnetic oxide material, preferably of a high density. Such ferrite material characteristically comprises a major portion of ferric oxide (about 50% of $Fe_2O_3$ or a similar ferromagnetic material); a lesser amount of zinc oxide (ZnO); a very minor portion of silicate ($SiO_2$) and the balance an oxide, either of manganese (MnO), of common nickel (NiO), or the like. High density ferrites are preferred for wear-resistance, gap-definition, etc.

As seen in the drawings, the core legs comprise two pieces (preferably C-shaped) having two junctures, one of which is of insignificant reluctance, the other constituting a "recording" (or "air") gap of prescribed reluctance. This air gap has heretofore characteristically been filled with a non-magnetic (not readily magnetizable or non-ferromagnetic) material, such as beryllium copper, mica, glass, or the like. The two legs are customarily adhered by a bonding agent such as a resin material. Such bonding agents have commonly comprised resins which I have found unsatisfactory, not being compatible with the core material, either forming a weak bond or being thermally degraded, such as by softening and/or shrinking under temperature stress—at times even cracking the ferrite during shrinkage. A feature of the invention is that such a ferrite core may be formed to include a "Havar" type spacer and a "filled" epoxy resin bonding agent. Such a spacer has been observed to give better gap definition than prior art metals, while being easier to control accurately than non-metal spacers, such as glass. A "filled" epoxy comprises an epoxy resin in which is suspended a non-magnetic, low-thermal-expansivity filler material such as alumina, ferrite similar ceramics or the like.

In conjunction with the above-described improved methods for producing casing structures for multitransducer head assemblies, the invention also contemplates an improved method of fabricating the transducer cores themselves in a manner which is more convenient and more accurate than the prior art so as to produce cores which are better matched and adapted for employment with slotted casings. More particularly, the invention contemplates fabrication of two-piece cores, with each core leg being cut to "slot-size" from a single leg-profile, the profiles both being fabricated from a single ferrite profile (block). Core-cutting operations upon the profile block enable one to form cores that are predimensioned matchingly and pre-aligned very precisely such as by lapping or finishing the block sides to a prescribed degree. It will be apparent to those skilled in the art that this method of cutting cores from a common profile accommodates a less fussy, but more precise, head-assembly procedure than is possible where individual cores are formed. This method also provides advantageous handling features whereby the gap-faces (and other surfaces) of the cores may be polished to a prescribed flatness and shape before they are cut from the common core-profile which is easier to work, offering more extended working areas, etc. than would be possible with individual cores. Thus, the invention provides a core-fabricating method which is economical for producing head-matched cores in quantity and yet with a high degree of precision.

Thus, it is an object of the present invention to provide multi-track magnetic head assemblies which are highly accurate and yet simple to manufacture.

Another object is to provide such assemblies having an intergral slotted casing member which may be highly accurately, yet simply formed, and may itself provide core-locating cavities.

Yet another object is to provide such assemblies which are ruggedized, having improved rigidity.

Still another object is to provide such assemblies which provide more accurate control over core and track location. Still another object is to provide such slotted casing structures at for fabrication by simple, precise machining techniques.

Still another object is to provide such assemblies having core units which are matched, being prefabricated together for location in such casing slots.

The foregoing objects and features of novelty which characterize the invention as well as other objects of the invention occurring to those skilled in the art are particularly pointed out in the claims annexed thereto and forming a part of the present specification. For a better understanding of the invention, its advantages and specific objects obtained with its use, reference should be had to the accompanying drawings wherein are illustrated and described preferred embodiments of the invention.

In the drawings, wherein like reference numerals denote like parts:

Figure 1:
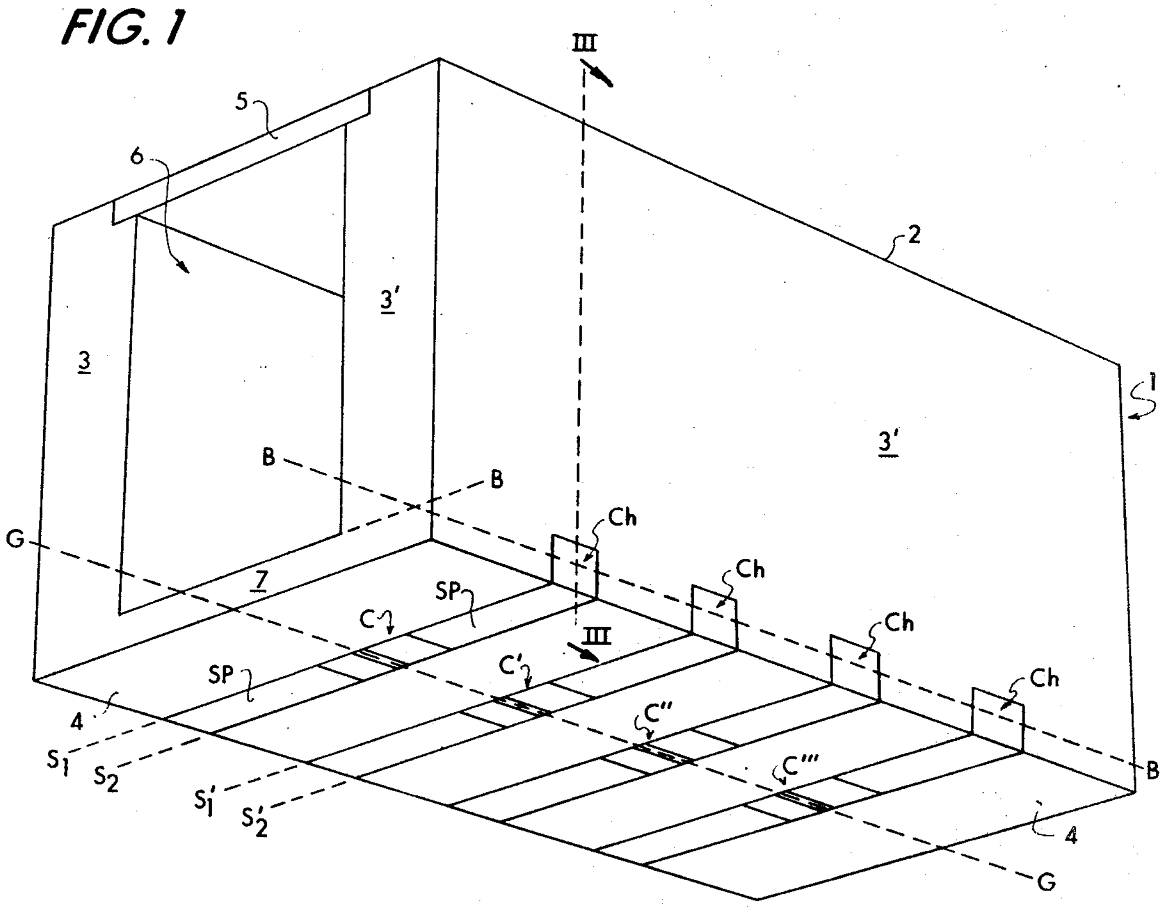
FIG. 1 is a bottom perspective view of a multitrack magnetic head assembly according to the invention.

With reference now to the drawings, FIG. 1 illustrates a preferred embodiment of a magnetic head assembly which forms the subject matter of the invention. It will be understood that FIGS. 1–7 are somewhat schematic, for instance, not being exactly representative of actual dimensions or proportions, since some of the members are enlarged and highlighted for clarity, being otherwise too small to be depicted clearly and accurately. Magnetic head assembly 1 is seen to assume a generally orthogonal parallellepiped form comprising a non-magnetic, integral, U-shaped casing 2 arranged to house a plurality of very carefully positioned transducer cores C, C′, C″, C‴. Cores C, etc. are located in slotted channel portions *Ch* of casing 2 being positioned therein by pairs of associated non-magnetic spacers SP. Casing 2 carries a relatively conventional transducer-connecting terminal board 5 mounting terminal pins T for electrical connection between external current supply means and each core via leads L thereto. The working (air) gaps of cores C, etc. are aligned in registry along a common gap-axis G—G to provide for accurate recording and sensing transduction of magnetic record media passing operatively adjacent. For instance, a multichannel magnetic tape may be driven transverse to axis G—G so that the channels (tracks) thereof pass in registry with associated ones of transducer cores C, etc.

CASING FEATURES

Figure 2:
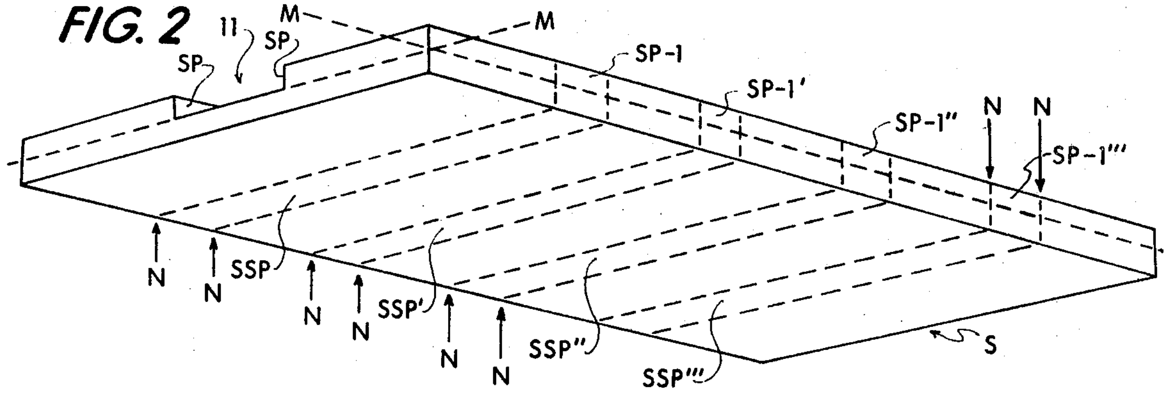
FIG. 2 is a bottom perspective view of a fabrication part from which matched pairs of slot spacers may be fashioned for insertion in the head assembly of FIG. 1.
Figure 3:
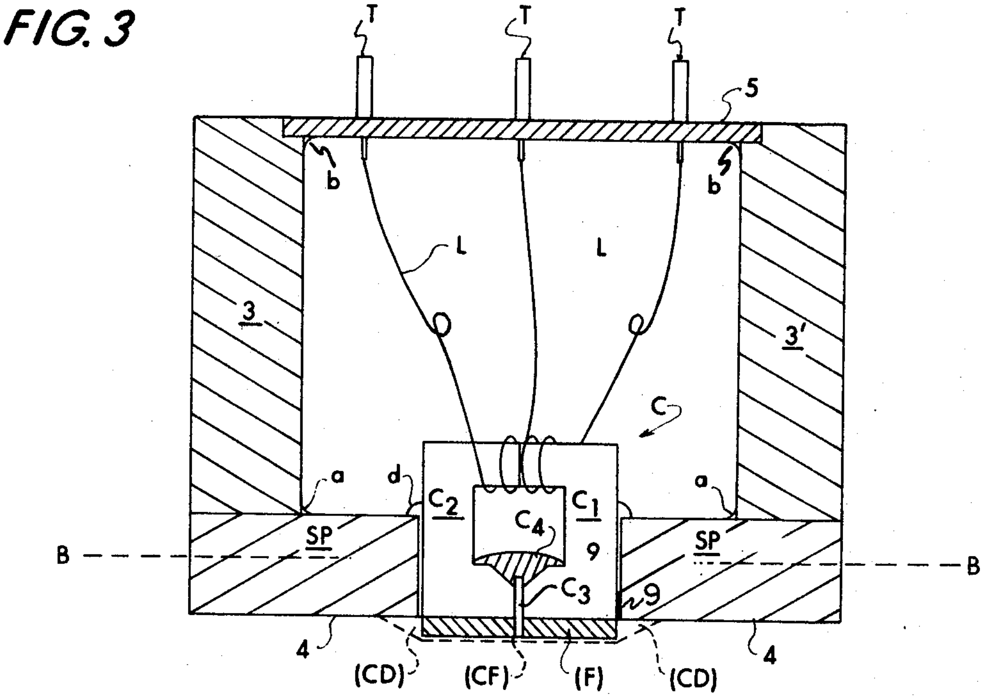
FIG. 3 is a sectional view along lines III—III of FIG. 1.

As seen from FIGS. 1–3, casing 2 comprises an integral U-shaped member having a pair of lateral portions, or sidewalls 3, 3′ surrounding an internal cavity 6 with a connecting base 7 extending therebetween to form the bottom of cavity 6. Cavity 6 may for instance be conveniently and accurately formed by slotting out a single oblong block (e.g. alumina) with rectilinear machining motions. This cavity may also be formed by moulding, being of relatively less critical dimensions. It will be appreciated that while only four channels *Ch* and associated cores and spacers are shown, any number of such channels may be used and also that a plurality of cores may be provided each channel, within the contemplation of the invention.

Figure 6:
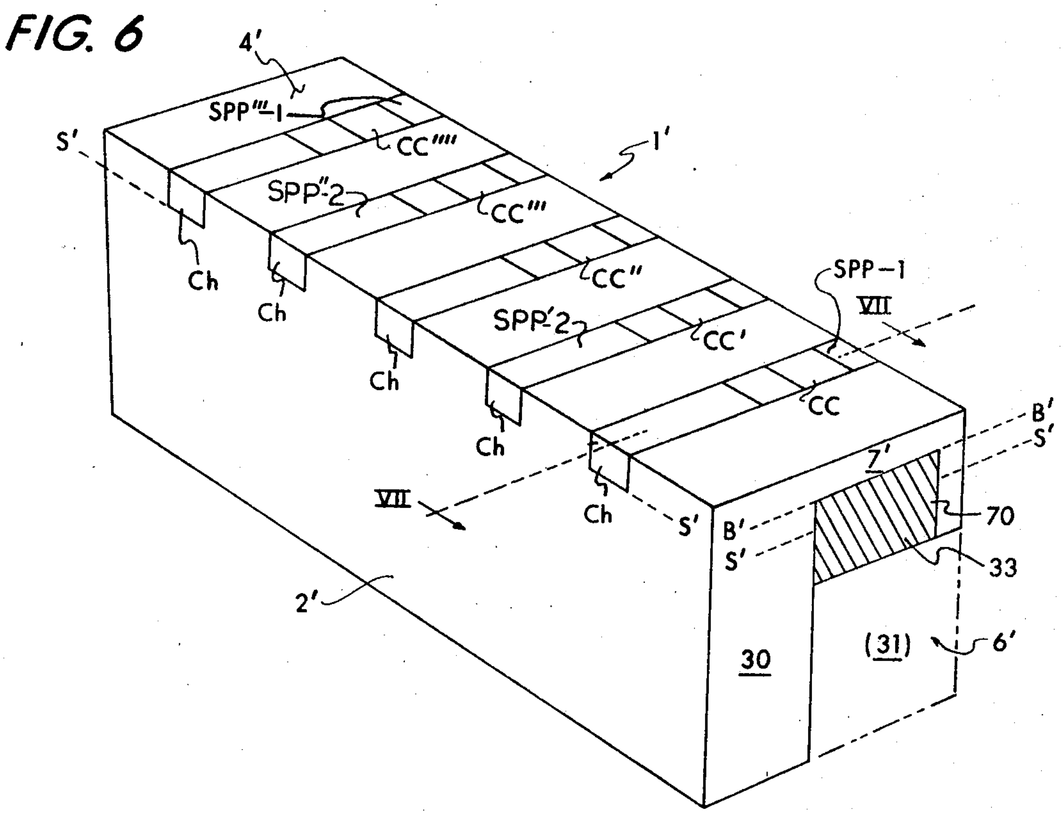
FIG. 6 is a top perspective view of an alternate multichannel magnetic head assembly modified from that of FIG. 1.
Figure 7:
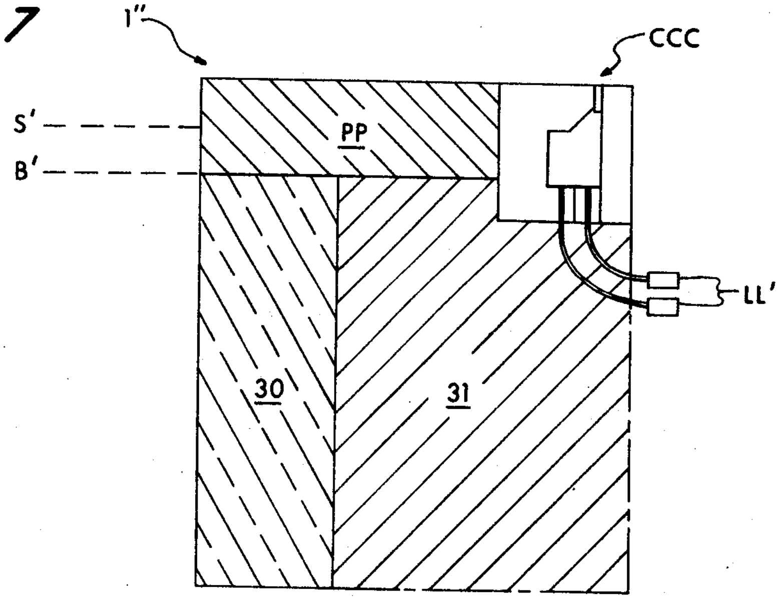
FIG. 7 is similar to a schematic sectional view along lines VII—VII of FIG. 6, being slightly modified therefrom.

Casing 2 as well as spacers SP are preferably comprised of a non-magnetic low-porosity ceramic, preferably of 96%–100% density. They are preferably comprised of high strength, high density, substantially pure polycrystalline aluminum oxide ($Al_2O_3$, an alumina ceramic). Such ceramics, even after firing, have been found especially susceptible of very accurate, convenient machining techniques (e.g. with diamond abrasives) to provide the slotted casing structure shown, as well as having good mechanical and thermal properties. While ceramics, in general, unlike metals, characteristically have unsatisfactory shock-resistance and tensile strength, alumina has been found suitable for this purpose, also being superior in wear resistance, non-abrasiveness, dimensional stability, rigidity and lightweight. Lightweight and rigidity are, of course, of special advantage in the case of "flying" heads (such as shown in FIGS. 6 and 7) which must be deftly, yet quickly, translated to "fly" over a spinning magnetic disc.

A feature of the invention is that integral ceramic U-shaped casing 2 is provided with a plurality of shallow channels *Ch* cut into the recording face 4 thereof so as to communicate with internal cavity 6 and thus allow the insertion of cores C etc. therethrough. Channels *Ch* will thus be cut transverse to the prescribed gap axis G—G, along the recording-track positions, the channels being defined between slotting lines S1/S2–S'1/S'2, etc.; as indicated in FIG. 1. Channel depth is thus prescribed so as to cut through base 7, that is, interrupt plane B—B defining the bottom of cavity 6. It will be seen that this permits the insertion of wound cores C etc. through base 7 so that the energizing coils thereof may be connected to terminal board 5. As noted for the embodiments in both FIGS. 1 and 6 for instance, it is important to form cavity 6 deeply internally of casing 2 so that communicating channels *Ch* may be kept of a very shallow depth, thus facilitating convenient of cutting and promoting. It will be seen that the accuracy of location and alignment may be best maintained when the channels are cut to a minimum depth, since the cutting tool may then be supported very close to its periphery and any wander slanting etc. may be minimized. Those conversant with techniques for machining slotted channels and the like will appreciate the difficulties one encounters in maintaining slot-centerline location. It is important, therefor, for high track densities in slotted magnet heads, wherein a slotted casing is used according to the invention to locate cores, to be careful to maintain slot-centerline location precisely, since by virtue of locating the cores, the slots establish recording track centerline locations. Thus, it is important to note that the prescribed casing slots may employ highly accurate shallow-slotting techniques, since the slotting depth need not be related to core dimensions, but the just deep enough, consistent with the rigidity and strength of the casing, to locate the cores. Tighter control on slot centerline locations (and consequently on track centerline locations) will make possible greater recording track densities and thus increase packing densities for recording systems improved according to the invention.

According to the invention spacers SP are comprised of precisely formed (e.g. machined) non-magnetic blocks (preferably alumina fashioned to assume relatively the same cross-sectional width as the channel *Ch*, in which they may be slip-fit, preferably also being slightly deeper than the channel so as to protrude somewhat therefrom to be later machined away. Pairs of the spacers SP may be matched dimensionally to assume a length along the exterior of an associated channel *Ch* to be spaced apart just enough to precisely define the length of the core-receiving cavity. Spacers SP may be rigidly secured to casing 2 by any convenient means, such as by coating mating surfaces by dabs *a* (FIG. 3) of an epoxy adhesive material, or the like. In certain cases, channels *Ch* will be found to have a slight radius, this is non-flatness or concavity along the bottom thereof (i.e. non-orthogonality with sides). Therefore in this, or other, cases an epoxy may better be inserted along the bottom of the channel for bonding the spacers therein. Spacers SP may be conveniently positioned in their respective channels *Ch* by alignment with one or both of the external surfaces of sidewalls 3, 3' as a reference aligning surface. Of course, in such a case the surfaces must be finished to assume a prescribed reference flatness. Alternatively, one such surface may be used to align both spacers by inserting a "core-cross-sectioned" plug temporarily therebetween. It will be appreciated that by precisely machining channels *Ch* according to the invention, convenient guide surfaces are thereby provided for locating matched spacers SP, which may be prefabricated to these exact dimensions. Channels *Ch* can so accurately and rigidly locate spacers SP that they may be bonded therein using only an ordinary epoxy adhesive (which might otherwise make the head deformable) and yet tolerate a polishing of the recording face that yields a flatness on the order of millionths of an inch.

Besides serving to precisely locate cores C etc. in channels *Ch*, spacers SP also serve to fill channels *Ch* about cores C etc. so as to present a smooth, relatively continuous wear-resistant and non-abrasive recording face 4 to magnetic media.

As indicated in FIG. 2, the above arrangement of spacers SP lends itself to particularly convenient spacer fabrication and assembly methods. For instance a block S of space (e.g. alumina) material may be used to form all of the spacers SP conjunctively permitting the slicing of pairs of spacers therefrom. Block S may thus be machined to assume a length exactly corresponding to the length of channels *Ch* (between sidewalls 3, 3') and a thickness somewhat greater than the depth of channels *Ch*. A central slot 11 may then be very exactly machined along block S to conform to the length of cores C (along channels *Ch*). Block S is now in condition to be sliced along slicing lines N to form pairs of spacers SP for insertion in each of the channels *Ch*. The slicing operation may, itself, establish the width of the spacers, though in certain cases a subsequent lapping operation may establish this. Each paired-spacer slice (SSP, SSP', SSP'', SSP''') may then be inserted into an appropriate channel *Ch* being conveniently positioned therein by registering one end thereof with the exterior of one of sides 3, 3'. The spacer slice may then be bonded to casing 2 for instance as indicated above. When all such slices have been secured in their appropriate channels, a machining operation may then be performed to take the slices down channel-depth to be coplanar with recording face 4. This plane being indicated along lines M—M and, as seen, eliminates the material between paired spacers. In the course of finishing the spacer slices, one may at the same time polish the recording face 4 so as to be optically flat and thus provide a core-locating surface; however, this opeartion may be deferred until the cores C etc. are secured in channels *Ch*, at which time the composite recording face 4 including the cores may be finished to assume the desired contour, such as by beveling or rounding the edges thereof to admit the passage of magnetic media. Once cores C etc. are fastened in place, then core leads L therefrom may be threaded through, or otherwise attached to, pins T of terminal board 5 which, itself, may then be boarded between sidewalls 3, 3', for instance, with dabs *b* of epoxy resin or similar adhesive material. It will thus be apparent that such a method of forming and assembling spacers can be very conveniently and accurately executed.

Other integral, slotted, casing structures, equivalent to the above-described embodiment in FIGS. 1–3, will suggest themselves to those skilled in the art. By an "integral" casing is meant one that is fashioned from a single piece of material rather than from plural parts. Such is the alternate embodiment shown in FIG. 6 comprising a similar multitrack magnetic head assembly 1' somewhat modified from head 1 and particularly adapted for use as a "flying" disc head. Thus, head assembly 1' comprises a non-magnetic casing 2' having a recording face 4' in which are cut identical, parallel channels Ch' communicating with a central cavity 6' and housing a plurality of identical transducer cores CC, CC', etc. located by spacer means SPP, SSP' etc. Casing 2' will be similar to casing 2 above-described except in being L-shaped, or partially U-shaped, to have only one sidewall 30 defining inner cavity 6' together with a base portion 7', defining the bottom of cavity 6'. Base 7' may be further relieved to be partially U-shaped, however, such as with slot 70 adapted to reduce the thickness of base 7' in the region of cores CC etc. Slot 70 would be cut out to a depth indicated at plane B'—B'. Channels Ch' would be relatively shallow, being cut out (machined carefully) to a depth indicated by lines S'—S' to communicate with slot 70 and allow the insertion of cores CC therethrough. An epoxy or other adhesive fill 33 may be inserted surrounding cores CC etc. to fill the remainder of slot 70 once the cores are secured in place. In addition the balance of cavity 6' may advantageously be filled such as with a flexible potting material 31 (indicated in phantom) to protect the head mechanically, barring entry of moisture, dust etc. Connectors LL are through potting 31 for connection with a power source (not shown).

Since cores CC etc. are best located adjacent the cantilevered end of the head assembly, outer spacers SPP–1, SPP'–1 etc. in FIG. 6 are shorter than their companion inner spacers SPP–2, SPP'–2, etc. respectively. For the same reason, the outer spacers are eliminated in the embodiment of FIG. 7, a modification of section VII—VII through embodiment of FIG. 6. Thus, merely a single spacer PP is inserted into each casing channel Ch' to locate an associated core (e.g. CCC). In such a case the added U-slotting (of slot 70) may be omitted and cavity 6' cut to make bottom 7 thinner. FIG. 7 also indicates a modified form of transducer core CCC, the circuit legs of which are not symmetrical, another expedient for getting the air gap closer to the outer end of "flying" disc head 1'. Otherwise modified head assembly 1'' is like head 1'; of FIG. 6.

CORE FEATURES

Once the spacers SP have been secured in place in their respective channels Ch as indicated above, the head assembly 1 is ready for insertion of the transducer cores in the cavities along channels Ch etc. between each spacer pair. In this way, the cores may be conveniently and accurately prefabricated to be slip-fit into that cavity almost exactly filling it and so be pre-located and pre-aligned therein. This prefabrication of cores may be seen to be especially adapted for use with the above-indicated casing structure, wherein core-cavities are most accurately and conveniently prefabricated. The prefabrication of cores is indicated relative to FIGS. 4 and 5 as described below. As fabricated, the cores preferably include an oversized depending face portion adapted to protrude slightly below the recording face (e.g. portion F in phantom below face 4 in FIG. 3) to be later machined away to the prescribed gap height and coplanar with the face once the cores are affixed to the casing. The cores may then be bonded to the casing and/or to the spacers, for instance by provision of glob d (FIG. 3) of adhesive preferably placed at one side of each core only, to allow for some compliance between the core and the rigid casing/spacer materials surrounding it.

According to a feature of the invention, a subsequent "bonding/protecting" may then be performed. As indicated in FIG. 3, the protruding portion F of the just-inserted core C may then be overlaid with fluent adhesive material covered to both form a protective coating (indicated in phantom at CD) around the edges of protruding core face F and also to provide additional bonding material therefor, such as is shown at glob 9 having intruded between a miniscule core/casing interface gap by capillary action. Protective coating CD may comprise an epoxy resin or the like and helps to guard the core-face edges against chipping. Such chipping will reduce tract-width and must be carefully guarded against, especially during subsequent lapping operations. Thus, the protruding face F of cores C, having protective coating CD thereon, may now be lapped to the desired profile and gap height to be flush with recording face 4 of casing 2, protective coating CD especially protecting the sides of core C against chipping during this operation.

While other constructions are feasible, it is preferred that cores C comprise two-piece ferrite transducers constructed, as indicated in FIG. 3, to comprise a pair of C-shaped ferrite circuit parts, or core legs, C1, C2 symmetrical rigidly secured in confronting relation by an adhesive mass, or bond, C4. Legs C1, C2 are arranged conventionally to have two of their two terminal faces abutting directly, in low-reluctance relation, with the other two faces comprising gap-defining faces C10, C20 (FIG. 4 surrounding an intermediate gap spacer C3. The cores should be constructed so that legs C1, C2 protrude sufficiently above base 7 of casing 2 (when core C is bonded thereto) to allow coil windings C5 to be connected to pins T of terminal board 5.

According to a feature of the invention, gap spacer C3 comprises a very thin non-magnetic metal shim, or foil, preferably of a non-magnetic metal; preferably non-magnetic "Havar" metal or the like. Such a metal has been found to give superior gap definition as opposed to conventional spacer material such as mica, berryllium copper or the like. It is also considerably more convenient, more rugged and more dimensionally controllable than glass spacers. Such non-magnetic hard metal shims have been used for gap sizes on the order of 0.0002" satisfactorily. Of course, instead of a shim, spacer C3 may comprise a deposited film (on one or both of the confronting surfaces of legs C1, C2) or be otherwise provided.

According to another feature of the invention bond C4 comprises a non-magnetic adhesive material which is mechanically and thermally compatible with the ferrite material comprising core legs C1, C2. A very satisfactory adhesive has been found to comprise a highly-filled epoxy resin system which cures above room temperature. For instance, a system comprising an epoxy resin filled with alumina and a similarly filled hardener has been found to be advantageous. This system provides a minimum amount of cure-shrinkage and thus avoids cracking the ferrite legs or separating from them, being arranged to shrink just enough during the prescribed curing (heat cycling) to provide a firm bond between the core legs C1, C2 without so overstressing them as to cause fracture and breakage. Thus, the adhesive system according to the invention is filled so as to create a strong bond having a bond strength which is comparable to the tensile strength of the (ferrite) core material and also to be compatibly expansible, having a thermal coefficient of expansion which is slightly greater than that of the (ferrite) core material. The other specific characteristics of the cores C etc. will be apparent from the following description of the preferred process for fabricating them.

Since cores C etc. will be adapted for insertion into pre-dimensioned channels in casing 2, above-described, it is preferred that they be prefabricated to exactly conform to the carefully controlled dimensions of these channels. The following describes such a prefabrication process, including steps which also serve to match the core dimensions conveniently. The C-shaped legs C1, C2 of each core C, C' etc. in a set for head 1 are to be cut from common leg profiles P1, P2, respectively, shown separately in FIG. 5 before joining. Profiles P1, P2 are carefully machined to the prescribed C-shape, being virtual mirror images, and are lapped so that their mating surface C11–C21 and C10–C20 (about spacer profile P–3) will be relatively coplanar. Thus, surfaces C11, C21 may be abutted into intimate low-reluctance contact while gap-defining faces C1–C20 may be brought together about thin spacer strip P3. Spacer strip P3, of course, prevents surfaces C11, C21 from mating in exact flatness but very slightly so, being so thin that their contact is still a satisfactorily intimate one. Spacer strip P3 is preferably of a non-magnetic hard metal such as "Havar" and comprises the parent stock from which the gap spacer C3 will be formed, of course. This arrangement of profiles P1, P2 joined together with P3 therebetween is compressed tightly together in a jig (or otherwise) to form composite profile P. A temporary filler plug, such as plug 15 is then inserted to fill a portion of the hollow annulus formed thereby. It is important to so compress strip P–3 between profiles P–1, P–2 since this not only establishes an intimate, predictable, low-reluctance joint therebetween, but also has been observed to compressively strengthen the ferrite material in the neighborhood of the air gap, improving the toughness and wear-resistance thereof.

Next, the filled adhesive material which will comprise bond C4 may be poured into the remaining vacant portion of this annulus (left by plug 15) and allowed to harden (e.g. by heat cycling), thus bonding the core profiles together with spacer strip P3 firmly embedded therebetween. Once the epoxy filler has hardened and the bond is formed, filler plug 15 may be removed, leaving a two-part, multi-core profile from which a set of cores (e.g. C, C′, etc.) may be cut, being dimensionally matched such as by first finishing profile P to prescribed dimensions. Profile P will be seen to lend itself to conjunctive lapping and other forming operations, whereby various faces of the material may be finished to conform profile P to prescribed dimensions so that all the cores to be cut therefrom may be matched, sharing common dimensions, alignment, and the like. For instance, the core recording faces C17/C27, C′17/C′27, etc. comprising face P–7 may be lapped clean, e.g. to check gap-definition and then be taken down to establish a prescribed gap length and gap height (e.g. the latter along faces C10, C20) as desired. The width of cores C, C′ etc. may also be conjunctively established and carefully matched by lapping the side faces C26, C16 of profile P to be aligned parallel and to define a common dimension therebetween giving a close fit in the cavity along channels *Ch* between spacers SP as mentioned above.

Figure 4:
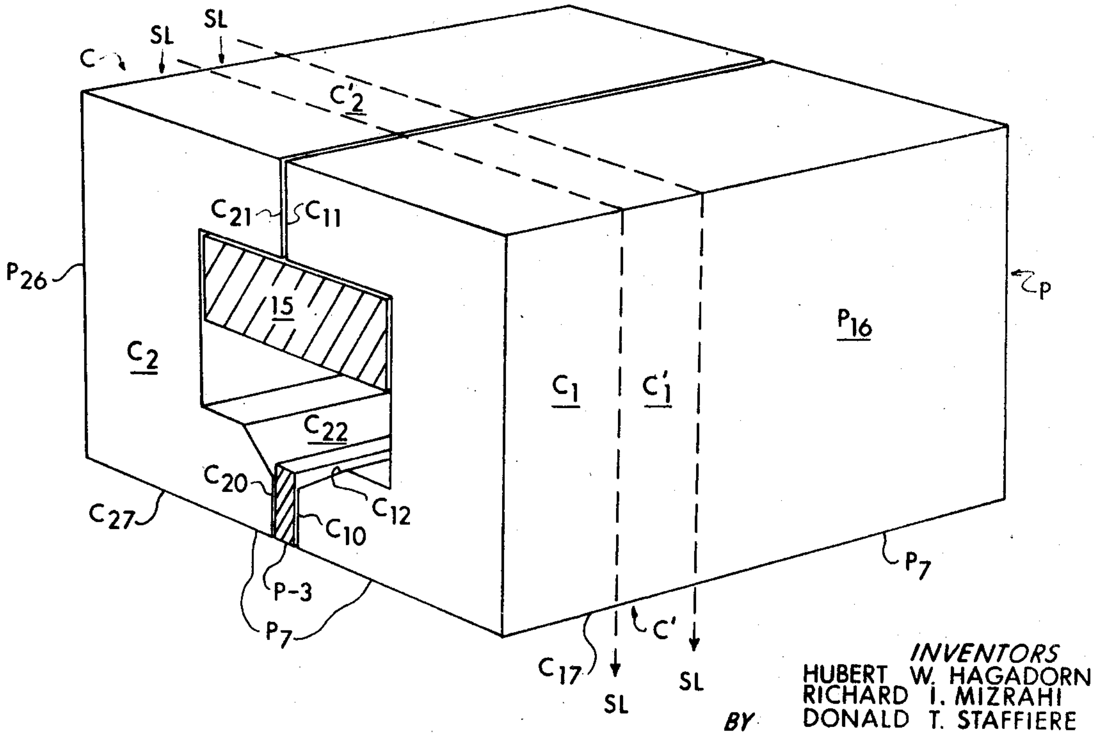
FIG. 4 is a perspective view of a fabrication part from which matched transducer core units may be formed for insertion in the head assembly of FIG. 1.
Figure 5:
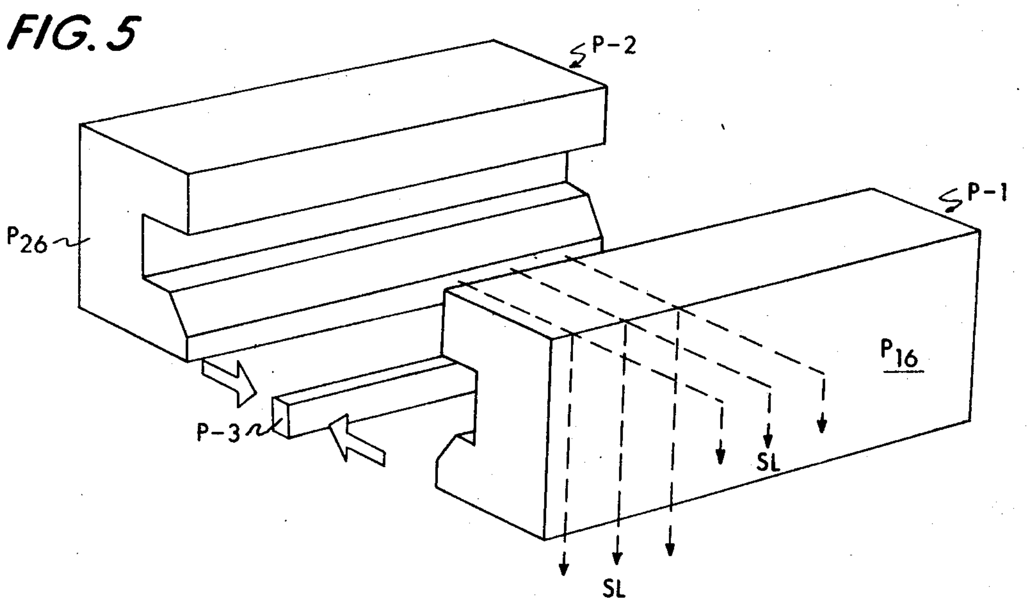
FIG. 5 is a perspective view of fabrication parts for the part shown in FIG. 4.

Core profile P is now ready to be sliced into individual core pieces, such as by the sectional, parallel cuts along slicing lines SL indicated in FIGS. 4 and 5. It may be mentioned, however, that in certain cases, such as where the adhesive bond comprising mass C4 is not used to cement the two profile legs P1, P2 together with sufficient rigidity, a reinforcement piece may be temporarily cemented to at least one side of the gap unit to maintain them joined together during these finishing and slicing operations. The cores may be sliced to be parallel and of identical width since the slicing instrument and core profile may readily be kept in precise constant alignment thus aligning the cores to be exactly parallel to the sides of channels *Ch* so that, in turn, the air gaps thereof will be parallel to gap axis G—G within the required tolerances. In some cases, it may be preferred to exactly define the core width (ultimately the track width) by slicing the cores slightly oversized and lapping them down to establish the final dimensions.

Each individual core C, C′ etc. once sliced, may now be provided with its winding C5 etc. and inserted, as indicated above, into its appropriate channel cavity between associated pairs of spacers SP. The sides of the channels and the ends of the spacers will exactly establish the location and inclination (slant) of these cavities so that the prefabricated cores will virtually exactly fill them being inserted preferably with a slip-fit. It will be appreciated that the above methods of core fabrication will be equally apt for cores C, C′ etc. in FIGS. 1–3, cores CC, CC′ etc. in FIG. 6 or any symmetrical core construction. With some modification, they will also apply to non-symmetrical cores, such as cores CCC, etc. in FIG. 7.

It will be recognized that this fabrication method according to the invention is convenient and advantageous over what has been done heretofore. For instance, while it enjoys all the convenience and accuracy of pre-fabricated recording faces, it does not require that the cores be embedded in the casing before the face is finished, thus avoiding lapping of casing and core materials together—something that often damages core surfaces by dragging casing (e.g. ceramic) material across them. Nor does this method so embed cores into a prefabricated face plate as to prevent removal thereof (e.g. for rework thereof) as has been done heretofore.

As mentioned above, a "Havar" type metal is preferred for spacer strip P3. Such a metal is a hard, high strength alloy not readily magnetizable. One such metal is a cobalt-base alloy having the following constituents and approximate proportions:

Cobalt—42.5%
Chrome—20.0
Iron—Balance
Nickel—13.0
Tungsten—2.8
Molybdenum—2.0
Manganese—1.6
Carbon—Minor
Beryllium—Very minor This alloy has Rockwell Hardness of about 60 as aged and work-hardens rapidly so that using it as a spacer in the magnetic heads above, and machining the surface thereof, advantageously improves the hardness and gap-definition thereof.

As aforesaid a substantially pure polycrystalline alumina is preferred for the casing and spacer material. It has been found especially advantageous to specify such an alumina having the following properties: over about 99% pure $Al_2O_3$ content; a density of over about 3.8; a high (metal-like) thermal conductivity (about 0.07 cal./cm.²/cm./sec./° C.) to minimize localized heating and resulting warping, etc.; and an extremely low porosity, being vacuum tight with less than 0.00% water absorption. It has been found preferable to specify porosity such as to yield a working surface having only a few percent void-area therein with no voids greater than 200 millionths of an inch.

By so forming cores C etc. from a common profile P according to the invention, it will be apparent that the core dimensions, the gap alignment and especially the core width (track width) may be carefully matched to be identical in any core-set adapted for insertion in a single multi-core assembly. It will also be apparent that the control over track width in a given head assembly may thus be more exactly and conveniently established. Core-sets are, thus, uniquely suited for insertion in the prefabricated channel, slotted into a head casing according to the invention. It will be evident to those skilled in the art that the above-described novel multitrack magnetic head assemblies including an integral, slotted casing member, prefabricated slot-filling spacer means, and prefabricated matched cores for insertion therein will provide an improved, simplified, ruggedized, long-wearing assembly, not subject to deviations from a controlled track width and similar prior art shortcomings. Such head assemblies also advantageously lend themselves to convenient techniques for pre-fabricating channel spacers such as that indicated in FIG. 2 and equivalents thereof. For instance, spacers SP–1, SP–1′, SP–1″ etc. may comprise a single unitary "slot" insertable in a shallow channel cut along the corresponding edge of recording face 4 transverse to channels *Ch*. Similarly spacers SP–2, SP–2′ etc. may comprise a second like "slot" insertable in a like channel on the opposite edge of face 4; the slots being epoxied to face 4 so as to fill portions of channels *Ch* thereunder.

While in accordance with the provisions of the patent statutes there have been illustrated and described above, the best forms of the invention known, it will be apparent to those skilled in the art that changes may be made in the process and apparatus described without departing from the spirit of the invention, and that in some cases, certain features of the invention may be used to advantage without a corresponding use of other features or with the substitution of equivalent features.

Having now described the invention, what is claimed as novel and for which it is desired to secure Letters Patent is:

1. A multi-track magnetic head assembly having the working transducer gaps thereof aligned along a prescribed gap axis elongate to the assembly, said assembly comprising:

an integral, one-piece casing of non-magnetic material having a recording face formed on a first portion and a pair of sidewalls depending from said first portion to define an internal cavity therebetween, said first portion having a plurality of identical, parallel channels formed therein transverse to said gap axis, said channels having a predetermined width and a depth sufficient that the bottom level of said channels communicates with said cavity, a pair of non-magnetic spacers fixed in each channel, said spacers being dimensioned to fill the cross-section of said channels and being spaced apart on each side of the gap axis, extending through said first portion to communicate with said cavity whereby a core-recess is formed by the channel sides and the ends of the spacers, extending from the internal cavity to said recording surface, said spacers being arranged to establish a precisely aligned array of identical core-recesses in said channels, and a plurality of relatively identical prefabricated matched transducer core means, each core means being affixed in one of said core-recesses to align a transducer gap in said core means along said gap axis.

2. A multi-track magnetic head assembly having the working transducer gaps therein aligned along a prescribed gap axis elongate to the assembly, said assembly comprising:

an integral, one-piece casing of non-magnetic material having a recording face formed on a first portion and at least one sidewall depending from said first portion to define an internal cavity therebetween, said first portion having a plurality of identical, parallel channels formed therein transverse to said gap axis, said channels having a predetermined width and a depth sufficient that the bottom level of said channels communicates with said cavity, spacer means fixed in each channel, said spacer means being dimensioned to fill the cross-section of said channels and being located to partly fill the length of said channel, said spacer means being arranged to establish an aligned array of identical core-recesses, each said core-recess being defined by the channel sides and said spacer means and extending from said internal cavity to said recording surface, and a plurality of relatively identical prefabricated matched transducer core means, each core means being affixed in one of said core-recesses to align a transducer gap in said core means along said gap axis.

3. The combination as recited in claim 1 wherein said core means each comprises a pair of ferromagnetic core legs, each leg having a pair of terminal face portions; bonding means securely affixed along confronting portions of said leg pieces so as to bond them rigidly together with corresponding terminal face portions confronting one another; and hard non-magnetic gap spacer means secured between one pair of said confronting face portions, each core means having been preformed to conform to said recesses.

4. The combination as recited in claim 3 wherein said core means are matched, each having been preformed from a common core profile and cut therefrom so as to be matched in dimensions and alignment with said core-recesses thus keeping said gaps so aligned.

5. The combination as recited in claim 1 wherein said casing is comprised of alumina material, said recording face portion thereof having been machined with identical slots forming said channels; and wherein said spacer means each comprises a pair of channel-conforming preformed alumina spacers inserted into one of said channels to define said recesses precisely.

6. The combination defined in claim 2 wherein said legs are comprised of sintered oxidic ferromagnetic material having a cubic crystalline structure; and wherein said gap spacer means comprises a strip of hard, non-magnetic Havar metal.

References Cited

UNITED STATES PATENTS

| | | | |
|---|---|---|---|
| 2,861,135 | 11/1958 | Rettinger | 179—100.2 |
| 2,923,780 | 2/1960 | Berman et al. | 179—100.2 |
| 3,098,126 | 7/1963 | Kaspaul | 179—100.2 |
| 3,327,313 | 6/1967 | Oliver | 340—174.1 |
| 3,376,397 | 4/1968 | Noorlander | 340—174.1 |

BERNARD KONICK, Primary Examiner

W. F. WHITE, Assistant Examiner

U.S. Cl. X.R.

29—603; 179—100.2; 346—74